United States Patent
Namuduri

(10) Patent No.: US 6,920,753 B2
(45) Date of Patent: Jul. 26, 2005

(54) MAGNETO-ELECTROHYDRAULIC POWER STEERING SYSTEM

(75) Inventor: Chandra Sekhar Namuduri, Troy, MI (US)

(73) Assignee: General Motors Corporation, Detroit, MI (US)

(*) Notice: Subject to any disclaimer, the term of this patent is extended or adjusted under 35 U.S.C. 154(b) by 59 days.

(21) Appl. No.: 10/408,752

(22) Filed: Apr. 7, 2003

(65) Prior Publication Data

US 2004/0194459 A1 Oct. 7, 2004

(51) Int. Cl.⁷ .............................................. F16D 37/02
(52) U.S. Cl. .......................................... 60/435; 60/326
(58) Field of Search ........................... 60/435, 326, 441

(56) References Cited

U.S. PATENT DOCUMENTS

| | | | | |
|---|---|---|---|---|
| 4,457,390 A | * | 7/1984 | Abe et al. ................... 180/422 |
| 4,643,269 A | * | 2/1987 | Arciero et al. ............... 180/421 |
| 5,732,791 A | * | 3/1998 | Pinkos et al. ................ 180/444 |
| 5,829,547 A | | 11/1998 | Fujii et al. .................. 180/422 |
| 6,227,452 B1 | * | 5/2001 | Teasdale et al. ........ 237/12.3 R |
| 6,290,043 B1 | * | 9/2001 | Ginder et al. ............... 192/21.5 |
| 6,659,218 B2 | * | 12/2003 | Thomas et al. ............. 180/402 |

* cited by examiner

*Primary Examiner*—Edward K. Look
*Assistant Examiner*—Michael Leslie
(74) *Attorney, Agent, or Firm*—Kathryn A. Marra

(57) ABSTRACT

A magneto-electrohydraulic power steering system for a vehicle includes a magneto-electrohydraulic power steering pump interconnecting a power steering gear of the vehicle and a drive shaft of an engine of the vehicle. The magneto-electrohydraulic power steering system also includes a controller operatively connected to the magneto-electrohydraulic power steering pump to generate a current signal to vary a speed of the magneto-electrohydraulic power steering pump.

20 Claims, 1 Drawing Sheet

MAGNETO-ELECTROHYDRAULIC POWER STEERING SYSTEM

TECHNICAL FIELD

The present invention relates generally to power steering systems for vehicles and, more particularly, to a magneto-electrohydraulic power steering system for a vehicle.

BACKGROUND OF THE INVENTION

It is known to provide a power steering system for a vehicle such as a motor vehicle to assist a driver in steering the motor vehicle. Typically, the power steering system is of a hydraulic type. The hydraulic power steering system employs an engine driven hydraulic power steering pump for generating pressurized fluid that is coupled to a hydraulic steering gear of the motor vehicle. Since the power steering pump is driven directly by the engine using a belt, its speed is determined by that of the engine and it operates continuously as long as the engine is running, resulting in continuous losses due to constant circulation of the hydraulic fluid through the steering gear. This results in increased fuel consumption due to continuous operation of the power steering pump even when no steering assist is required. In addition, the power steering pump has to provide the required flow and pressure for the worst case engine speed, which could be near idle, under static steering conditions, contributing to significant fuel consumption. This results in much higher pump flow at higher engine speeds further increasing the losses in the hydraulic power steering system, which results ultimately in increased fuel consumption.

More recently, electrohydraulic power steering systems have been used to provide an on-demand hydraulic pressure using an electric motor to drive the hydraulic power steering pump. An example of such electrohydraulic power steering system incorporates a hydraulic power steering pump driven by a brushless direct current electric motor controlled by a pulse width modulated inverter. However, the electrohydraulic power steering system needs a costly high power electric motor, power electronics for controlling speed of the electric motor, and a reliable electrical power supply (including an engine driven alternator and battery). The overall losses of the conventional electrohydraulic power steering system include losses through the engine alternator, power electronics, electric motor, and power steering pump.

As a result, it is desirable to provide a magneto-electrohydraulic power steering system for a vehicle that minimizes power losses in a power steering pump. It is also desirable to provide a magneto-electrohydraulic power steering system for a vehicle that controls pressure of the steering system using a power steering pump. It is further desirable to provide a magneto-electrohydraulic power steering system that provides variable power steering assist at a relatively low cost. Therefore, there is a need in the art to provide a magneto-electrohydraulic power steering system that meets these desires.

SUMMARY OF THE INVENTION

It is, therefore, one object of the present invention to provide a magneto-electrohydraulic power steering system for a vehicle.

It is another object of the present invention to provide a magneto-electrohydraulic power steering system that minimizes power losses in a power steering pump and for controlling pressure of the steering system using the same.

To achieve the foregoing objects, the present invention is a magneto-electrohydraulic power steering system for a vehicle including a magneto-electrohydraulic power steering pump interconnecting a power steering gear of the vehicle and a drive shaft of an engine of the vehicle. The magneto-electrohydraulic power steering system further includes a controller operatively connected to the to the magneto-electric power steering pump to generate a current signal to vary a speed of the magneto-electrohydraulic power steering pump.

One advantage of the present invention is that a magneto-electrohydraulic power steering system is provided for a vehicle. Another advantage of the present invention is that the magneto-electrohydraulic power steering system adopts direct control of the speed of the hydraulic power steering pump by using a magneto-rheological fluid (MRF) clutch integrated between the engine drive shaft and the power steering pump. Yet another advantage of the present invention is that the magneto-electrohydraulic power steering system improves vehicle fuel efficiency due to elimination of in-path inefficiencies of a conventional electro-hydraulic power steering system. Still another advantage of the present invention is that the magneto-electrohydraulic power steering system reduces cost due to a relatively simple device and low current power-electronics. A further advantage of the present invention is that the magneto-electrohydraulic power steering system provides variable steering assist by adjusting a pump speed of the power steering system. Yet a further advantage of the present invention is that the magneto-electrohydraulic power steering system has reduced mass due to the elimination of an electric motor and high current power electronics. Still a further advantage of the present invention is that the magneto-electrohydraulic power steering system improves reliability due to reduced number of components. Another advantage of the present invention is that the magneto-electrohydraulic power steering system uses a magneto-rheological fluid-based controllable clutch that can provide fast and precise control of pump speed over a wide operating range at low cost.

Other objects, features, and advantages of the present invention will be readily appreciated, as the same becomes better understood, after reading the subsequent description taken in conjunction with the accompanying drawings.

DESCRIPTION OF THE PREFERRED EMBODIMENT

Figure 1:
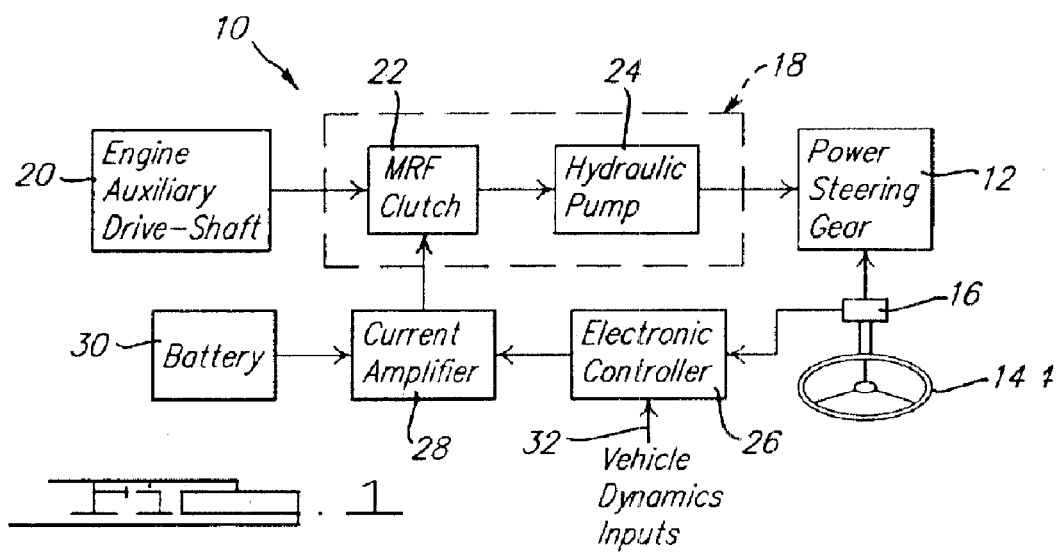
FIG. 1 is a diagrammatic view of a magneto-electrohydraulic power steering system, according to the present invention.

Referring to the drawings and in particular FIG. 1, one embodiment of a magneto-electrohydraulic power steering system 10, according to the present invention, is shown for a vehicle (not shown) such as a motor vehicle or automotive vehicle. The magneto-electrohydraulic power steering system 10 includes a steering gear 12 and a steering wheel 14 operatively connected to the steering gear 12. The magneto-electrohydraulic power steering system 10 also includes a steering wheel sensor 16 operatively connected to the steering wheel 14 to sense angle and/or torque of the steering wheel 14. It should be appreciated that the steering gear 12, steering wheel 14, and steering wheel sensor 16 are conventional and known in the art.

The magneto-electrohydraulic power steering system 10 includes a magneto-electrohydraulic power steering pump, generally indicated at 18, operatively connected to the power steering gear 12 and a drive-shaft such as an auxiliary drive-shaft 20 of an engine (not shown) of the vehicle. The magneto-electrohydraulic power steering pump 18 includes a magneto-rheological fluid clutch 22 and a hydraulic pump 24 to be described. The magneto-electrohydraulic fluid clutch 22 is used to directly control the speed of the hydraulic pump 24 by providing a continuously adjustable speed by controlling the torque transmitted from the drive-shaft 20 to that of the hydraulic pump 24. It should be appreciated that the magneto-rheological fluid clutch 22 can be part of the pump assembly or a separate unit.

The magneto-electrohydraulic power steering system 10 also includes an electronic controller 26 electrically connected to the steering wheel sensor 16. The electronic controller 26 includes a central processing unit (CPU), algorithm and memory, and a vehicle and sensor interface (not shown). The magneto-electrohydraulic power steering system 10 also includes a current amplifier 28 electrically connected to the magneto-rheological fluid clutch 22 and the electronic controller 26. The current amplifier 28 is electrically connected to a source of electrical power 30 such as a vehicle battery and is electrically connected to a ground (not shown) such as a vehicle frame (not shown) for return current path. It should be appreciated that the controller 26 may also include a communication bus (not shown) interconnecting the CPU, memory, interface, and current amplifier 28.

The controller 26 receives information from at least one, preferably a plurality of inputs 32 such as vehicle dynamic inputs from other vehicle sensors (not shown) and vehicle controllers (not shown) such as vehicle speed, wheel speed, yaw rate, lateral acceleration, side slip angle, road surface condition or type, and other vehicle dynamics related data via the communication bus or through individual signal lines. The controller 26 provides at least one output from the current amplifier 28 to the magneto-rheological fluid clutch 22 to control the current through a coil 62 of the magneto-rheological fluid clutch 22. It should be appreciated that the controller 26 is used to interface the steering wheel sensor 16 (steering wheel angle, steering wheel torque, etc.) and vehicle dynamic sensors (speed, brake pedal position, etc.) to generate a current signal to the coil 62 in the magneto-rheological fluid clutch 22 to vary the speed of the hydraulic pump 24. It should also be appreciated that the magneto-electrohydraulic power steering system 10 may include an integrated speed sensor (not shown) within the hydraulic pump 24 and/or a pressure sensor (not shown) in the hydraulic lines (not shown) to provide additional control information to the electronic controller 26 for adjusting the current to the coil 62 of the magneto-rheological fluid clutch 22.

Figure 2:
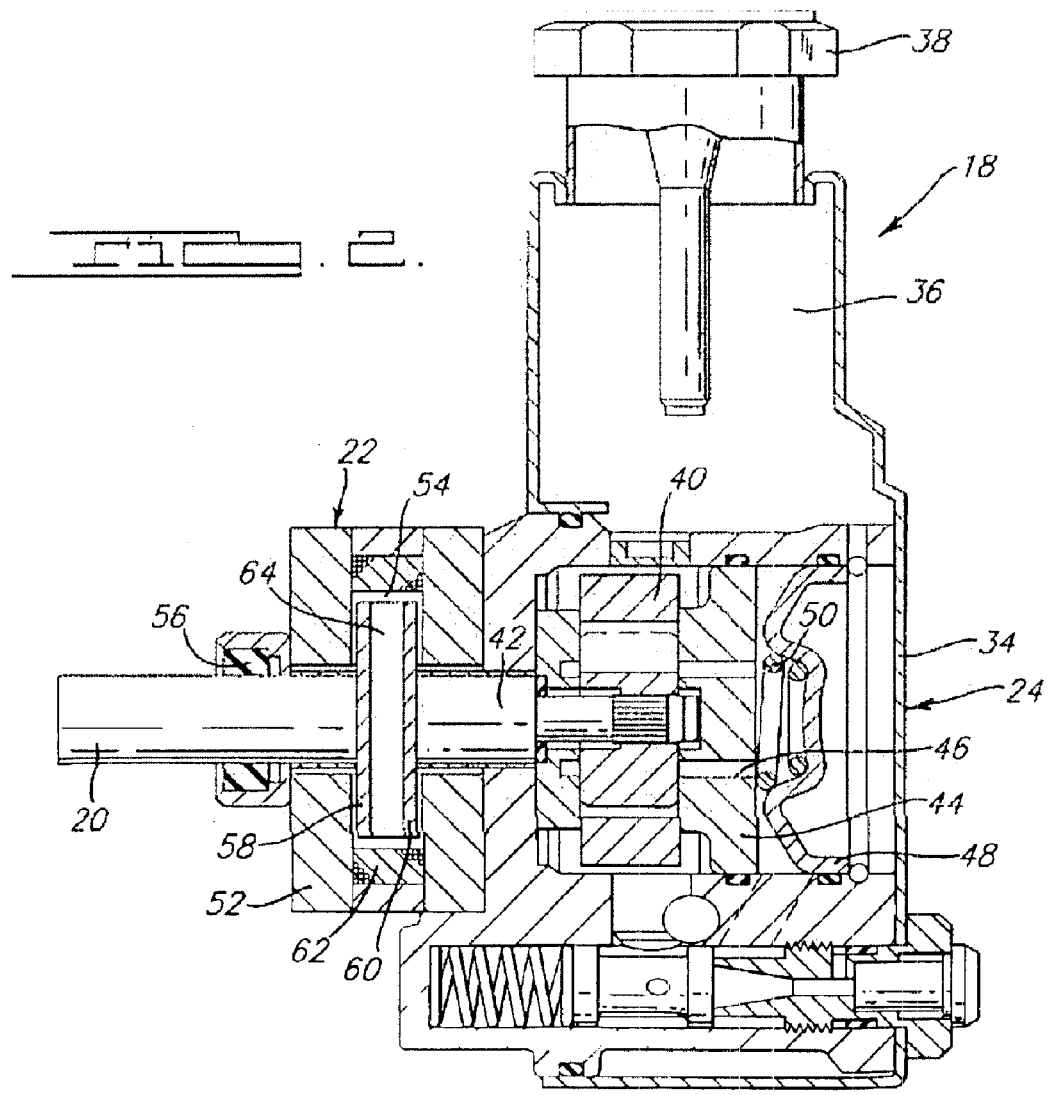
FIG. 2 is a fragmentary elevational view of a magneto-hydraulic power steering pump, according to the present invention, of the magneto-electrohydraulic power steering system of FIG. 1.

Referring to FIG. 2, the magneto-electrohydraulic power steering pump 18 is shown. As illustrated, the magneto-electrohydraulic power steering pump 18 includes the magneto-rheological fluid clutch 22 and hydraulic pump 24 integrated as a single unit. The hydraulic pump 24 includes a housing 34 forming a fluid reservoir 36 at an upper end thereof. The hydraulic pump 24 has a removable cap 38 closing the opening of the reservoir 36. The hydraulic pump 24 also includes a vane pump member 40 disposed within the housing and an intermediate shaft 42 having one end connected to the vane pump member 40 and the other end connected to the magneto-rheological fluid clutch 22. The hydraulic pump 24 also includes a support member 44 disposed in the housing 34 adjacent the vane pump member 40 and have fluid passages 46 extending therethrough. The hydraulic pump 24 includes a return member 48 disposed in the housing 34 adjacent the support member 44 and a return spring 50 disposed between the support member 44 and return member 48. It should be appreciated that, except for the intermediate shaft 42, the hydraulic pump 24 is conventional and known in the art.

The magneto-rheological fluid clutch 22 includes a housing 52 attached to the housing 34 and disposed about and spaced radially from the drive-shaft 20 and intermediate shaft 42. The housing 52 has a cavity 54 with axial open ends. The housing 52 is made of a ferrous material. The housing 52 is attached by suitable means (not shown) to the housing 34 of the hydraulic pump 22.

The magneto-rheological fluid clutch 22 includes a bearing 56 disposed about the drive-shaft 20 at one open end of the housing 52. The bearing 56 is of a sealed roller type to allow rotation of the drive-shaft 20 relative to the housing 52. It should be appreciated that the other open end of the housing 52 is sealed by the housing 34.

The magneto-rheological fluid clutch 22 also includes a drive member 58 disposed within the cavity 54 of the housing 52 and connected to the drive-shaft 20. The drive member 58 is generally circular in shape. The drive member 58 is made of a ferrous material. The drive member 58 is fixed to the drive-shaft 20 by suitable means (not shown).

The magneto-rheological fluid clutch 22 also includes a driven member 60 disposed within the cavity 54 of the housing 52 and connected to the intermediate shaft 42. The driven member 60 is generally circular in shape. The driven member 60 is made of a ferrous material. The driven member 60 is fixed to the intermediate shaft 42 by suitable means (not shown).

The magneto-rheological fluid clutch 22 also includes a coil 62 disposed within the cavity 54 of the housing 52 and about the drive member 58 and the driven member 60. The coil 62 is spaced a predetermined distance from the driven member 58 and drive member 60. The coil 62 is connected by suitable means such as wires (not shown) to the current amplifier 28.

The magneto-rheological fluid clutch 22 further includes a magneto-rheological (MR) fluid 64 disposed in the cavity 54 of the housing 52 between the drive member 58 and driven member 60. The MR fluid 64 contains magnetizable particles such as carbonyl iron spheroids of about one (1) to ten (10) microns in diameter dispersed in a viscous fluid such as silicone oil which has a viscosity of between about 20 and 50,000 mPa. It should be appreciated that the MR fluid 64 may also contain surfactants, flow modifiers, lubricants, viscosity enhancers, and other additives. It should also be appreciated that the MR fluid 64 is conventional and known in the art.

In operation of the magneto-electrohydraulic power steering system 10, the electronic controller 26 adjusts the current of the coil 62 of the magneto-rheological fluid clutch 22 based on an algorithm, which is programmed into the memory of the controller 26. The control algorithm for adjusting the current to the coil of the fluid clutch 22 utilizes all or some of the information from the inputs 32 and the steering wheel sensor 16. The electronic controller 26 sends a signal to the fluid clutch 22 through the current amplifier 28 to pass a current through the coil 62 to generate a magnetic field across the MR fluid 64 between the driver member 58 and the driven member 60. The strength of the magnetic field increases or decreases the apparent viscosity of the MR fluid 64 and thus increases or decreases the speed of the hydraulic pump 24. The apparent viscosity of the MR fluid 64 determines the amount of rotation of the intermediate shaft 42 and vane pump member 40, thus varying the speed of the hydraulic pump 24. It should be appreciated that the amount of current passed through the coil 62 is programmable by the electronic controller 26, thus affecting the strength of the magnetic field within and viscosity of the MR fluid 64. Though a single gap, parallel plate type MR fluid clutch is shown, other configurations such as multiple plate, multiple gap or cylindrical type MR fluid clutches can be used.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A magneto-electrohydraulic power steering system for a vehicle comprising:
    a power steering gear;
    a magneto-electrohydraulic power steering pump interconnecting said power steering gear of the vehicle and a drive shaft of an engine of the vehicle, said magneto-electrohydraulic power steering pump including a magneto-rheological fluid clutch;
    an electronic controller electrically connected to said magneto-rheological fluid clutch to generate a current signal to vary a speed of the magneto-electrohydraulic power steering pump; and
    a current amplifier electrically interconnecting said electronic controller and said magneto-rheological fluid clutch to control current of the current signal through a coil of said magneto-rheological fluid clutch.

2. A magneto-electrohydraulic power steering system as set forth in claim 1 including a battery connected to said current amplifier to provide electric current or power to said current amplifier.

3. A magneto-electrohydraulic power steering system in claim 1 wherein said magneto-electrohydraulic power steering pump comprises a hydraulic pump operatively connected to said power steering gear and said magneto-rheological fluid clutch connected to said hydraulic pump and the drive-shaft.

4. A magneto-electrohydraulic power steering system as set forth in claim 3 including an intermediate shaft spaced axially from the drive-shaft and having one end connected to said magneto-rheological fluid clutch and another end connected to said hydraulic pump.

5. A magneto-electrohydraulic power steering system as set forth in claim 4 wherein said magneto-rheological fluid clutch includes a housing disposed about and spaced from said intermediate shaft and having a cavity therein.

6. A magneto-electrohydraulic power steering system as set forth in claim 5 wherein said magneto-rheological fluid clutch includes at least one drive member disposed in said cavity and connected to the drive-shaft.

7. A magneto-electrohydraulic power steering system as set forth in claim 6 wherein said magneto-rheological fluid clutch includes at least one driven member disposed in said cavity and connected to said intermediate shaft.

8. A magneto-electrohydraulic power steering system as set forth in claim 7 wherein said magneto-rheological fluid clutch includes a coil disposed in said cavity and about said drive member and said driven member and electrically connected to said electronic controller.

9. A magneto-electrohydraulic power steering system as set forth in claim 8 including a magneto-rheological fluid disposed in said cavity between said drive member and said driven member.

10. A magneto-electrohydraulic power steering system as set forth in claim 1 including a steering wheel sensor operatively connected to a steering wheel and said electronic controller to input information to said electronic controller.

11. A magneto-electrohydraulic power steering system comprising:
    a power steering gear;
    a magneto-electrohydraulic power steering pump comprising a hydraulic pump connected to said power steering gear and a magneto-rheological fluid clutch connected to said hydraulic pump and for connection to a drive shaft of an engine, said magneto-rheological fluid clutch including a coil;
    a current amplifier electrically connected to said coil of said magneto-rheological fluid clutch to provide current to said coil of said magneto-rheological fluid clutch; and
    an electronic controller electrically connected to said current amplifier to generate the current from said current amplifier to vary a speed of the magneto-electrohydraulic power steering pump.

12. A magneto-electrohydraulic power steering system as set forth in claim 11 including a battery connected to said current amplifier to provide electric current or power to said current amplifier.

13. A magneto-electrohydraulic power steering system as set forth in claim 11 including an intermediate shaft spaced axially from the drive-shaft and having one end connected to said magneto-rheological fluid clutch and another end connected to said hydraulic pump.

14. A magneto-electrohydraulic power steering system as set forth in claim 13 wherein said magneto-rheological fluid clutch includes a housing disposed about and spaced from said intermediate shaft and having a cavity therein.

15. A magneto-electrohydraulic power steering system as set forth in claim 14 wherein said magneto-rheological fluid clutch includes at least one drive member disposed in said cavity and connected to the drive-shaft.

16. A magneto-electrohydraulic power steering system as set forth in claim 15 wherein said magneto-rheological fluid clutch includes at least one driven member disposed in said cavity and connected to said intermediate shaft.

17. A magneto-electrohydraulic power steering system as set forth in claim 16 wherein said coil is disposed in said cavity and about said drive member and said driven member.

18. A magneto-electrohydraulic power steering system as set forth in claim 17 including a magneto-rheological fluid disposed in said cavity between said drive member and said driven member.

19. A magneto-electrohydraulic power steering system as set forth in claim 18 including a steering wheel sensor operatively connected to a steering wheel and electrically connected to said electronic controller to input information to said electronic controller.

20. A power steering system comprising:
    a power steering gear;
    a power steering pump connected to said power steering gear;
    an intermediate shaft connected to said power steering pump and axially aligned with a drive shaft of an engine;
    a magneto-rheological fluid clutch connected to said intermediate shaft and for connection to the drive shaft, said magneto-rheological fluid clutch including a coil;
    a current amplifier electrically connected to said coil to provide current to said coil; and
    an electronic controller electrically connected to said current amplifier to generate the current from said current amplifier to said coil to vary a speed of said power steering pump.

* * * * *